United States Patent
Lundy et al.

(10) Patent No.: US 8,331,912 B1
(45) Date of Patent: Dec. 11, 2012

(54) UPDATEABLE MESSAGING

(75) Inventors: Michael T. Lundy, Olathe, KS (US);
Jason K. Whitney, Lee's Summit, MO (US); John Paul McCloskey, Kensington, MD (US); Mitchell M. Carr, Potomac Falls, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 639 days.

(21) Appl. No.: 11/781,048

(22) Filed: Jul. 20, 2007

(51) Int. Cl.
*H04M 3/42* (2006.01)

(52) U.S. Cl. .................. 455/414.1; 455/411; 455/422.1; 455/412.1; 455/412.2; 455/413; 455/466; 455/72; 455/41.3; 455/41.2; 455/464; 455/455; 455/450; 455/452.2; 455/451; 709/203; 709/223; 709/212; 709/213; 709/207; 709/227

(58) Field of Classification Search ............... 455/414.1, 455/411, 422.1, 412.1, 412.2, 413, 466, 72, 455/41.3, 41.2, 464, 455, 452.2, 451, 450; 709/203, 223, 212, 213, 207, 227
See application file for complete search history.

(56) References Cited

U.S. PATENT DOCUMENTS

| 2006/0019634 A1* | 1/2006 | Hawkes ........................ 455/411 |
| 2007/0208802 A1* | 9/2007 | Barman et al. ................ 709/203 |
| 2007/0244758 A1* | 10/2007 | Xie ................................. 705/14 |

OTHER PUBLICATIONS

Big String, No More Sender Regret! No Software to Download, www.bigstring.com/email_info.php, Apr. 23, 2007.

* cited by examiner

*Primary Examiner* — Charles Appiah
*Assistant Examiner* — Alexander Yi

(57) ABSTRACT

A method, system, and medium are provided for dynamically updating a message communicated in telecommunications protocol. Typically, the updatable message is configured to include at least updateable attributes including an identifier that identifies the message as capable of being updated and a set of variables associated with selectable options. Upon receiving the message, a notification may be communicated to one or more mobile devices within a group, where the one or more devices are configured to present representations of the selectable options, status attribute, and content at a user interface. In embodiments, the change indication may be provided by a member of a group, where the indication triggers a messaging-network provider to automatically modify the content of the message. Concomitantly, information may be communicated to one or more mobile devices to alert the user without generating a separate message.

18 Claims, 7 Drawing Sheets

UPDATEABLE MESSAGING

SUMMARY

The present invention is defined by the claims below. Embodiments of the present invention solve at least the above problems by providing a system and method for, among other things, dynamically updating a message upon receiving a change indication, e.g., an indication of a user selecting a selectable option. The present invention has several practical applications in the technical arts including utilizing selectable options to modify the updateable (user-changeable) attributes, e.g., content of the message, or trigger a service provider to execute a command prior to, or after, consumption of the message. Accordingly, the message may reflect user inputs to provide accurate and timely content without the nuisance and confusion of exchanging multiple messages.

The present invention relates generally to dynamically updating a message communicated in telecommunications protocol. More particularly, the present invention relates to, in a first aspect, receiving the message. Typically, the message is configured to include at least an identifier and updateable attributes that includes content and variables associated with a set of selectable options. Upon receiving the message, if the identifier is recognized, the message may be identified as having the capability of being updated incident to receiving a change indication having a selectable option. Additionally, upon receipt of the message, a notification may be communicated to one or more mobile devices within the group, where the one or more devices are configured to present representations of the selectable options, status attribute, and content. In embodiments, the change indication may be received from a member of a group or from a service provider, where the indication causes the updateable attributes of the message to automatically modify. Concomitantly, information (e.g., an updated-message notification) is communicated to the mobile devices in the group that re-alert user(s) of the update without creating a separate message. As such, if multiple change indications are received, then the message(s) targeted by the change indications can be updated multiple times.

In a second aspect, embodiments of the present invention are directed toward one or more computer-readable media for conveying information associated with a dynamically updateable message that is received via a messaging network. Initially, a message is received in telecommunications protocol from one or more mobile devices, typically within a group or from a service provider. In one embodiment, the message has one or more changeable attributes associated therewith. Next, underlying code of the message may be parsed to determine whether an identifier (e.g., script extension) is embedded therein. If an identifier is recognized, the message is identified as having the capability of being updated incident to receiving a change request. Typically, a notification is communicated to one or more mobile devices of the group incident to identifying the message as being updateable. Then an indication may be received from a mobile device upon a user selecting one or more selectable options embedded in the message. Upon receiving the indication from one or more mobile devices of the group, the content of the message is automatically modified.

A further aspect of the invention takes the form of one or more computer-readable media having computer-executable instructions embodied thereon for presenting on a mobile device a user interface configured to presentation aspects of a dynamically modifiable message. Typically, the message is communicated in telecommunications protocol, and in particular, SMS or MMS telecommunications protocol. The user interface includes a first, second, and third display area. Initially, the first display area presents one or more selectable options associated with updateable attributes within code of the message. In one embodiment, the updateable attributes are altered incident to a user selecting the one or more selectable options. The second display area presents content. The content may be automatically modified to correspond to the modified updateable attributes. In one embodiment, the content is automatically modified to correspond to the modified updateable attributes prior to the second display area presenting the content to the user. The third display area presents a representation of a status attribute. With even more specificity, the status attribute indicates the one or more selectable options selected by the user.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
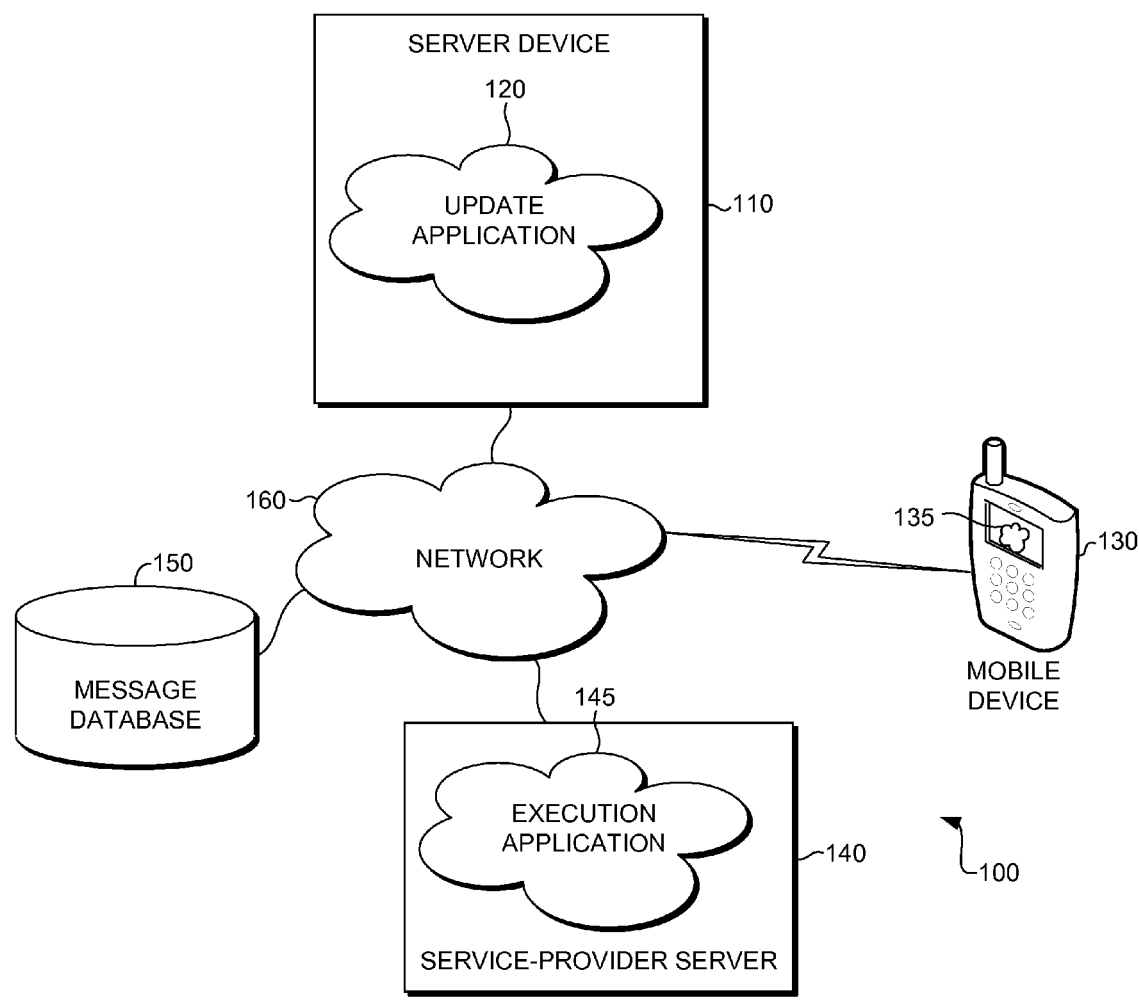
FIG. 1 is a block diagram of an exemplary system architecture suitable for use in implementing embodiments of the present invention.

Embodiments of the present invention provide systems and methods for dynamically updating a message by sending a change indication that automatically updates (e.g., appends or prepends) updateable attributes of the message incident to the message being consumed. Allowing a message to be updated after an originator has communicated the message provides flexibility in modifying the updateable attributes of the message (e.g., content or variables associated with selectable options), and facilitates receiving and aggregating feedback from a group of users. Further, updateable messaging facilitates coordination of action among a group or among individuals. In one embodiment, these contextually relevant updates may occur prior to the message being opened and consumed by one or more members of the group. Typically, selectable options are embedded within the message that may be presented and selected. Selections may be made by users of mobile devices, service providers, administrators of the messaging network, process controls, rules-based control engines, and the like, and may communicate an indication of a selected selectable option. Indications are, among other things, associated to updateable attributes embedded in the underlying code of the updatable message. These updateable attributes may be leveraged to perform a variety of functions. In one instance, an indication of a selected selectable option may alter an updateable attribute (e.g., variable) that results in the content of the message to be automatically modified such that subsequent retrieval of the message presents the modified content on a user interface (e.g., refresh the latest bid on an online auction). In another instance, an indication may alter an updateable attribute that triggers a service provider to execute a particular command (e.g., turn off a home-security alarm). Accordingly, by modifying the content of the received message, as opposed to redistributing the message with changes, a messaging resource having considerably more timely and accurate information, as well as providing historical context, is provided.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| SMS | Short Message Service |
|---|---|
| MMS | Multimedia Messaging Service |
| SMSC | Short Message Service Center |
| MMSC | Multimedia Messaging Service Center |

Further, various technical terms are used throughout this description. An illustrative resource that fleshes out various aspects of these terms can be found in *Newtons Telecom Dictionary* by H. Newton, $22^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Methods and systems are provided for dynamically updating a message upon receiving a change indication. The term "message" refers to multi string, multi threaded communication communicated between components within a messaging network. Typically, the message is communicated in telecommunications protocol. The "SMS" and "MMS" standards for telephony message systems are considered as a potential embodiment of the telecommunications protocol that may be used to communicate the messages discussed hereinbelow. In particular short message service (SMS) is typically a transport architecture for sending text messages (e.g., 160 characters or less), while multimedia messaging service (MMS) allows for sending messages that include multimedia objects (e.g., images, audio, video, rich text, etc.). These messaging systems are mainly deployed in wireless networks where a short message service center (SMSC), or a multimedia messaging service center (MMSC) provides a store-and-forward mechanism where a notification may be sent to a user of a mobile device upon receiving a message. The user may then request to retrieve the message that is communicated for presentation on the mobile device. Although SMS and MMS telecommunications protocol are discussed below, they are only one example of suitable message systems within a network environment and are not intended to suggest any limitation as to scope of use or functionality of the invention. Neither should the invention be interpreted as having any dependency or requirement relating to any one or combination of particular telecommunications protocols depicted in the exemplary discussion herein.

Further, the message may include updateable attributes such as "content," and code having "updateable attributes" and "identifier" embedded therein. Content generally refers to an informational portion of the message, such as a text message, digital photo, audio signal, and other media understood and appreciated by those of ordinary skill in the art as being presentable on a user interface of a mobile device. In one instance, the user interface is capable of presenting a rich display that may include a variety of types of content.

The updateable attributes (e.g., user-changeable attributes) are data in the underlying code of the message that are associated with, or mapped to, selectable options. That is, upon selection of one or more selectable options by a user or a service provider, the updateable attributes are altered. If an updateable attribute is altered, the content of the message may be automatically modified to correspond with the selected selectable option. By way of example and not limitation, if the selectable option "attend the meeting" is selected, a variable, which is a form of an updateable attribute, within the underlying code may be altered. This altered updateable attribute may consequently automatically modify the content of the message to, perhaps, include the selecting user on a list of attendees for the meeting. Persons of ordinary skill in the art will understand and appreciate that the updateable attributes, variables, may be associated with actions which are different from the specific illustrated example. Therefore it is emphasized that the invention is not limited only to this embodiment but embraces updateable attributes mapped to a wide variety of actions, whether selectable options, service provider actions, or any other messaging network functions.

The underlying code of the message may be read and/or parsed to determine whether an identifier is recognized. The identifier embedded in the underlying code, if recognized, indicates that the message is updatable after being received by one or more mobile devices. In one embodiment, the identifier may be a script extension that contains programming logic that may be interpreted and processed by a mobile device. This programming logic may further institute a script engine within the mobile device to present the message and perform the functions of the message, more fully discussed below. If programming logic is not provided in the identifier, the script engine may be provisioned into the mobile device by the messaging network. In this instance, a pure peer-to-peer network is established that may interact by exchanging, interpreting, and updating messages without the assistance of a server device. If however, programming logic is not provided in the identifier and a script engine is not provisioned in the mobile device, a script engine may be located at the server device. In this instance, the mobile devices in the group are provided a point-of-contact that stores and updates the messages.

As discussed above, in one embodiment, the updateable attributes, such as variables, may be associated with, or mapped to, selectable options. The term "selectable option," as used hereinbelow generally refers to any action that is selectable by a user of a mobile device. A scope of the selectable options is demonstrated by, but not limited to, the following sets of options: respond to a home alarm, control a remote camera, vote for lunch, attend meeting, order a custom pizza, etc. Those familiar with the messaging industry will understand and appreciate that the types of selectable options are numerous and include a broad range of selectable options.

Further, these selectable options may be configured by the user of the mobile device, the service provider, an administrator of the messaging-service server, or any other party with rights on the messaging network. In addition, the configuration of the selectable options may change upon updating the message in response to selectable option selections. By way of example, the user may customize the selectable options for a particular event, such as lunch, so that the selectable options correspond to an inquiry (e.g., "Vote on a location for lunch"), and provide relevant information to the user. In this example, the selectable options may be related to choices of eating locations, restaurants, or the like. Further, selection of the selectable options may automatically modify content of the message to reflect the selections (e.g., providing a dynamically updated bar graph demonstrating the group's preference based on multiple indications from voting members).

In an exemplary embodiment, the message may be received by one or more members of a group (e.g., mobile device users on a "friends list"). Typically, the group is generated by the originator of the message. As part of the group, each member may select one or more selectable options and update the content of the message that is presented to any member retrieving the message thereafter. In another embodiment, the group may include a service provider that is associated with members of the group (e.g., a home-security company for the family living in the home being protected). Although two examples are discussed above, the present invention contemplates groups being comprised of any party, individual, firm, company, or entity that is capable of receiving messages from the messaging network. By way of example only, a member of the group may be a user of a mobile device that is not an authorized client of the messaging network. In this example, the user's mobile device may still receive the message; however, functionality embedded in the dynamically updatable message may be limited based on the capabilities of the unauthorized mobile device and its compatibility with the messaging network.

Exemplary Operating Environment

Referring to the drawings in general, and initially to FIG. 1 in particular, a block diagram of an exemplary computing system is shown and designated generally as computing system 100 configured to provide for performing a method of dynamically updating a message upon receiving a change indication. It will be understood and appreciated by those of ordinary skill in the art that the computing system 100 shown in FIG. 1 is merely an example of one suitable computing system environment and is not intended to suggest any limitation as to the scope of use or functionality of embodiments of the present invention. Neither should the computing system 100 be interpreted as having any dependency or requirement related to any single component or combination of components illustrated therein.

The computing system 100 includes a server device 110, a mobile device 130, a service-provider server 140, and a messaging database 150, all in communication with one another via a network 160. Although the various components of FIG. 1 are shown with lines for the sake of clarity, in reality, delineating various components is not so clear, and metaphorically, the lines would more accurately be grey and fuzzy. Further, although the various components of FIG. 1 are depicted as single blocks, it should be understood and appreciated by those of ordinary skill in the art that the components are exemplary in nature and in number and are not to be construed as limiting (e.g., mobile device 130 may be a representation of a multitude of mobile devices connected to network 160). Network 160 may operably connect components 110, 130, 140, and 150 by wire (e.g., a cable connection), in a wireless fashion (e.g., communications network), or any combination thereof. Further, the network may include, without limitation, one or more local area networks (LANs) and/or wide area networks (WANs). In embodiments, network 160 is a messaging network or a communications network. Such networking environments are commonplace in offices, enterprise-wide computer networks, intranets, and the Internet. Accordingly, network 160 is not further described herein.

Each of server device 110 and service-provider server 140 shown in FIG. 1 may be any type of computing device. By way of example only and not limitation, components 110 and 140 may be a personal computer, desktop computer, laptop computer, handheld device, mobile handset, consumer electronic device, and the like. Additionally, components 140 and 160 may be configured to present a user interface and/or receive input, where input may be received by, for example, a microphone, joystick, game pad, wireless device, keyboard, keypad, stylus, game controller, treadmill, force plate, and any other input-initiating component that provides wired or wireless data. It should be noted, however, that the present invention is not limited to implementation on such computing devices but may be implemented on any of a variety of different types of computing devices within the scope of embodiments hereof.

Returning to FIG. 1, server device 110 may be configured to dynamically update a message upon receiving a change indication. Server device 110 includes an update application 120. In some embodiments, update application 120 may be implemented as a stand-alone application. In other embodiments, the illustrated update application 120 may be integrated directly into the operating system of mobile device 130, service-provider server 140, and messaging database 150. In the instance of multiple server devices 110, the present invention contemplates providing a load balancer to federate incoming signals from mobile device 130 and service-provider server 140. It will be understood by those of ordinary skill in the art that update application 120 illustrated in FIG. 1 is exemplary in nature and in number and should not be construed as limiting. Any number of applications may be employed to achieve the desired functionality within the scope of embodiments of the present invention.

In one embodiment in particular, a portion of update application 120 may reside on mobile device 130. As such, mobile device 130 may perform as a peer-to-peer device that exchanges, interprets, and updates messages over network 160 without the assistance of server device 110. In another embodiment, update application 120 may be included in the identifier and/or underlying code of the message as programming logic. That is, the message is self-executable on mobile device 130 (e.g., institute a script engine with each message), without provisioning mobile device 130 with a script engine to interpret or update the message. In this instance, presenting a representation of the message may be similar for both a mobile device 130 that is a client of network 160 and a mobile device 130 that is not authorized on network 160.

Referring again to FIG. 1, steps taken by the update application are now discussed in detail. It should be understood and appreciated that the subject matter of the present invention is described with specificity herein to meet statutory requirements; however, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Initially, update application 120 may receive a message in telecommunications protocol from one or more mobile devices 130 within a group or from service-provider server 140. As discussed above, the message may include underlying code with updateable attributes and an identifier embedded therein. The updateable attributes are typically associated with one or more selectable options that may be selectable by one or more members of a user group, or a service provider. Incident to receiving the message, update application 120 may store the message. Storage of the message may be at server device 110, at message database 150, or any other component on network 160, including mobile device 130.

Update application 120 may parse the underlying code of the message to determine whether an identifier is embedded therein or referenced thereby. If an identifier is recognized, the message may be identified as having the capability of being updated incident to receiving a change indication. If an identifier is not recognized (e.g., mobile device 130 is not registered with, or a client of, network 160), then the message may be sent as a standard message being communicated in telecommunications protocol. That is, the message is formatted as a purely informational message with no updatable capabilities or selectable option functionality.

Further, update application 120 may communicate a notification to the one or more mobile devices 130 of the group incident to identifying the message as being updateable. That is, the notification alerts the user that a new message is received at server device 110. In one embodiment, the notification is a representation of the message; as such, a user of mobile device 130 is made aware of a new message without the burden on network 160 of communicating and storing the entire message. In another embodiment, the notification is simply information that provides an alert on mobile device 130. As more fully discussed below, with reference to FIG. 7, the user may be alerted to the presence of a new message by an audio signal, indicia of the message displayed in an inbox, flashing light, vibration of mobile device 130, and any other manner of alerting a user known or used by those of ordinary skill in the art.

Update application 120 may receive an indication upon a user, or service provider, selecting the one or more selectable options embedded in the message. User selection may be made at mobile device 130. Incident to selection, a change indication is communicated to server device 110. In one embodiment, the indication has a target tag appended thereto, where the target tag corresponds to the identifier of one or more stored messages. In one embodiment, one or more stored messages are targeted for updating based on a comparison of the target tag and the identifiers of the stored messages. Incident to determining a match, the message is identified as being targeted for update.

In another embodiment, an indication may be in response to a user modifying selection privileges of one or more members of the group, more fully discussed with reference to FIG. 6. Typically, the user sending this type of indication has administrative rights over the group, or is provided rights by the selectable options embedded within the message. Incident to receiving the indication to modify privileges, update application 120 may alter the privileges of the one or more members identified by the user. By way of example only, upon receiving a subsequent change indication from one or more members having altered privileges, update application 120 may determine to ignore the indication, if privileges were revoked, or satisfy the indication, if privileges were not revoked with relation to the indication received.

Even further, update application 120 may be configured to automatically modify the content of the message upon receiving one, or a plurality of, change indications from the one or more mobile devices 130 of the group. As discussed above, incident to receiving the change indication, a stored message may be targeted. The targeted message may be updated based on the altered updateable attributes mapped to selected selectable options. Updating may comprise one or more of the following: automatically modifying the content of the message, updating the status attribute of the message, or any other change to the underlying code of the message that may be made while it is stored by a component within network 160.

With more specificity, automatically modifying the content of the message includes recognizing the altered updateable attributes and modifying the content to which the updateable attributes are associated. That is, a selectable option made by a user will modify the updateable attributes, or content, of the message as viewed thereafter by any of the members of the group. By way of example and not limitation, a service provider (e.g., weather channel) may originate and communicate a message (e.g., weekly weather forecast) to members of a group (e.g., persons who have signed-up for the weather service). If the circumstances have changes that would cause the contents of the message to now be inaccurate (e.g., change in the forecast), service-provider server may communicate one or more indications that target the message and automatically updates the content, upon each indication, to reflect accurate information (e.g., content of the message, upon retrieval by a user, now presents the changed forecast).

In another example, a member of the group (e.g., mom) may originate and communicate a message (e.g., inquiry to determine what pizza toppings to order) to members of the group (e.g., family as defined by a contacts list). Members of the group may respond to the message by selecting selectable options (e.g., pepperoni, sausage, mushrooms, olives, none, no vote, etc.) that typically prompt change indications to be communicated. The indications may automatically modify the updateable attributes, or content, so as to aggregate the indications (e.g., display a graph or listing of the selected selectable options) without generating a separate message for each indication. In one embodiment, information such as an updated-message notification is communicated to mobile devices 130 in the group upon automatically modifying the content. Continuing in this embodiment, a re-alert is provided at mobile device 130 upon receiving the information. An exemplary embodiment of a re-alert in response to an updated-message notification is to manipulate the position of an indicia of the message within an inbox. As such, at any time after the message is received and prior to being erased, any member of the group may be alerted to retrieve the message upon modification of the content. Further, upon retrieval, the latest content, as automatically updated by each previous change indication, is presented upon consuming the message at mobile device 130.

In these examples, the originator of the message may configure the selectable options to correspond with the message updateable attributes. Or, the selectable options may be predetermined in a template message made available on network 160.

Updating the status attribute of the message generally refers to updating an attribute within the updateable attributes in the underlying code of the message that relates to the message status (e.g., new, unaltered, updated, marked for deletion, etc.). In one embodiment, more fully discussed below with reference to FIG. 7, the status attribute may reflect when the latest modification to the content was made, and possibly, by which member of the user group. A representation of the status attribute may be presented at a user interface 135 of mobile device 130 upon a user retrieving the message. In an exemplary embodiment, the status attribute and/or modified content are stored in association with the message.

Mobile device 130 is configured to transmit a communication, discussed more fully above, to network 160. In addition, mobile device 130 may be any type of device having communications capability. By way of example only and not limitation, the mobile device 130 may be a personal computer, desktop computer, laptop computer, handheld device, mobile handset, consumer electronic device, cell phone, PDA, GPS units, and the like. It should be noted, however, that the present invention is not limited to implementation on such devices but may be implemented on any of a variety of different types of devices within the scope of embodiments hereof. In addition, each mobile device 130 will preferably include a user interface 135. User interface 135 may be presented on any presentation component (not shown) of mobile device 130 that may be capable of displaying output video visually observable by the user (e.g., television monitor, including cathode ray tube, liquid crystal display, plasma screen, or any other display type), or presenting a representation of a message to a user (e.g., audio signal, vibration, flashing lights, etc.). In an exemplary embodiment, user interface 135 may present a screen display with a first display area that is configured for presenting a representation of one or more selectable options associated with updateable attributes within code of the message; a second display area configured for presenting content, wherein the content is automatically modified to correspond to the modified updateable attributes; and a third display area configured for presenting a representation of a status attribute, wherein the status attribute indicates the one or more selectable options selected by the user. Although three different display areas on user interface 135 have been discussed, it should be understood and appreciated by those of ordinary skill in the art that other display areas could be used, and that the invention is not limited to those shown (e.g., FIG. 7) and described.

Service-provider server 140 may be a computing device existing in network 160 configured to perform a variety of functions. One of these functions may include originating a message and communicating it to server device 110, mobile devices 130 in the group, or any other components in network 160. Another of these functions may include detecting a change indication and executing a command corresponding to the selectable option.

Continuing from the example above, indications in response to a message may be aggregated at the message (e.g., showing which pizza toppings are preferred by the recipients of the group). Upon receiving a change indication from the last member of the group to respond, that indication may trigger execution application 145 to execute a command (e.g., pizza restaurant receives an online order for the pizza with the preferred toppings). In another example, a change indication (e.g., turn off home alarm), in response to a message from service-provider server 140 (e.g., home-security system alerting of an intruder), may directly trigger execution application 145 to execute a command associated with the selectable option (e.g., turning off the alarm). In this embodiment, the message may be generated from a rules-based control engine of the service-provider server 140. Concomitantly, the content of the message may be automatically modified to include new content indicating an action has been taken with respect to the original message (e.g., alarm was false and is now off).

Messaging database 150 may be configured to store, and to be searchable for, received messages. In one instance, the received messages are stored in association with an update attribute, or the update attribute may be embedded in the underlying code of the message.

In another instance, the message may be stored in association with content and/or modified content, or the content may be embedded in the underlying code of the message. In one embodiment, a short message service center (SMSC), or a multimedia messaging service center (MMSC) may be employed as a format of messaging database 150. As such, incident to a user requesting to retrieve the stored message, messaging database 150 may communicate information related to the message for presentation on user interface 135 of mobile device 130. Further, though illustrated as a single, independent component, database 150 may, in fact, be a plurality of databases, for instance, a database cluster, portions of which may reside on components 110, 130, and 140 of network 160, another external computing device (not shown), and/or any combination thereof.

Figure 2:
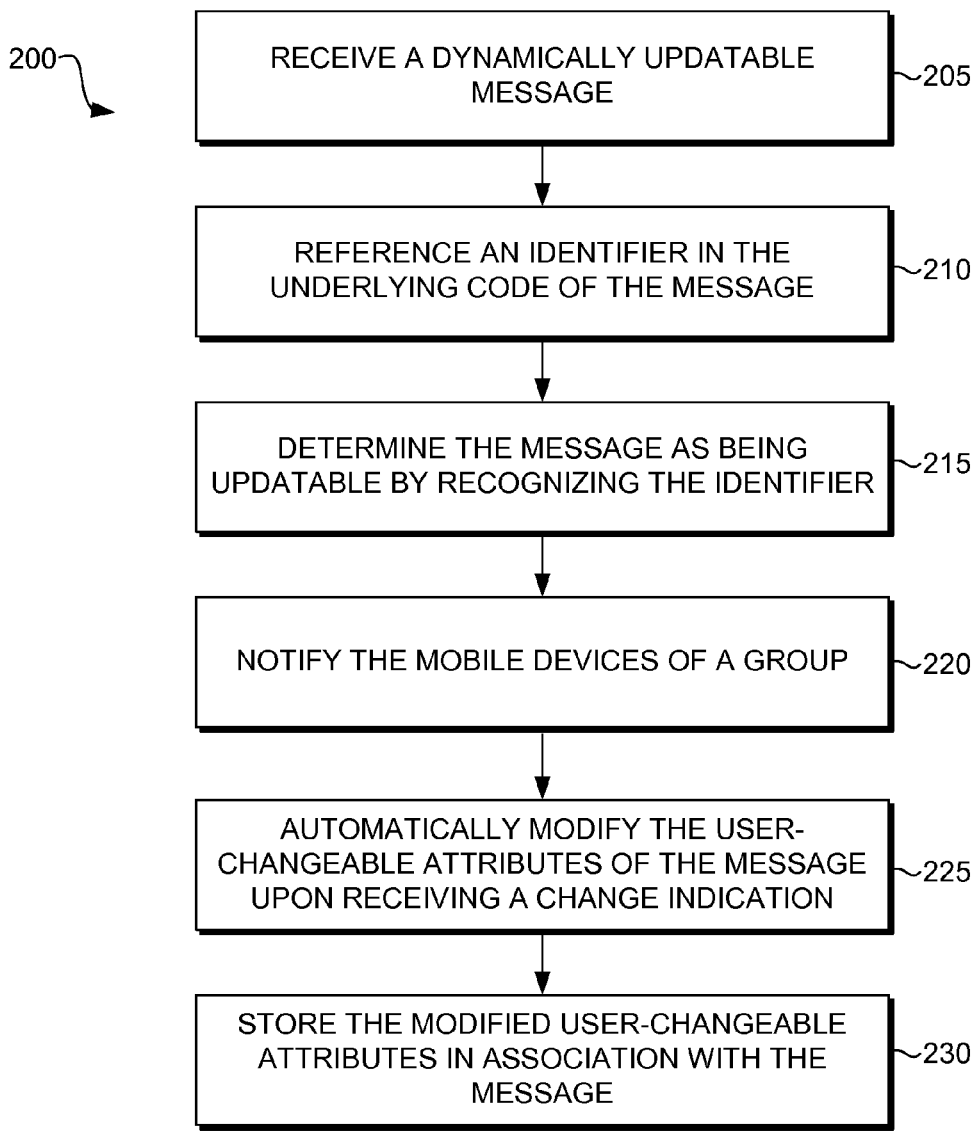
FIG. 2 is a flow diagram showing an overall method for dynamically updating a message upon receiving a change indication, in accordance with an embodiment of the present invention.

Turning now to FIG. 2, a flow diagram is illustrated showing an overall method 200 for dynamically updating a message upon receiving a change indication, in accordance with an embodiment of the present invention. Initially, as indicated at block 205, a message that is dynamically updatable is received, e.g., utilizing update application 120. Next, as indicated at blocks 210 and 215, the underlying code of the message is parsed and based on whether an identifier is referenced, the message is identified as being updatable. A notification that an updatable message was received is communicated to the mobile devices in the group, as indicated at block 220. Incident to receiving a change indication from a mobile device in the group, as indicated at block 225, updateable attributes of the message are automatically modified, such as content and variables associated with selectable options. In one embodiment, the content and/or modified content is stored in association with the message. This is indicated at block 230.

Figure 3:
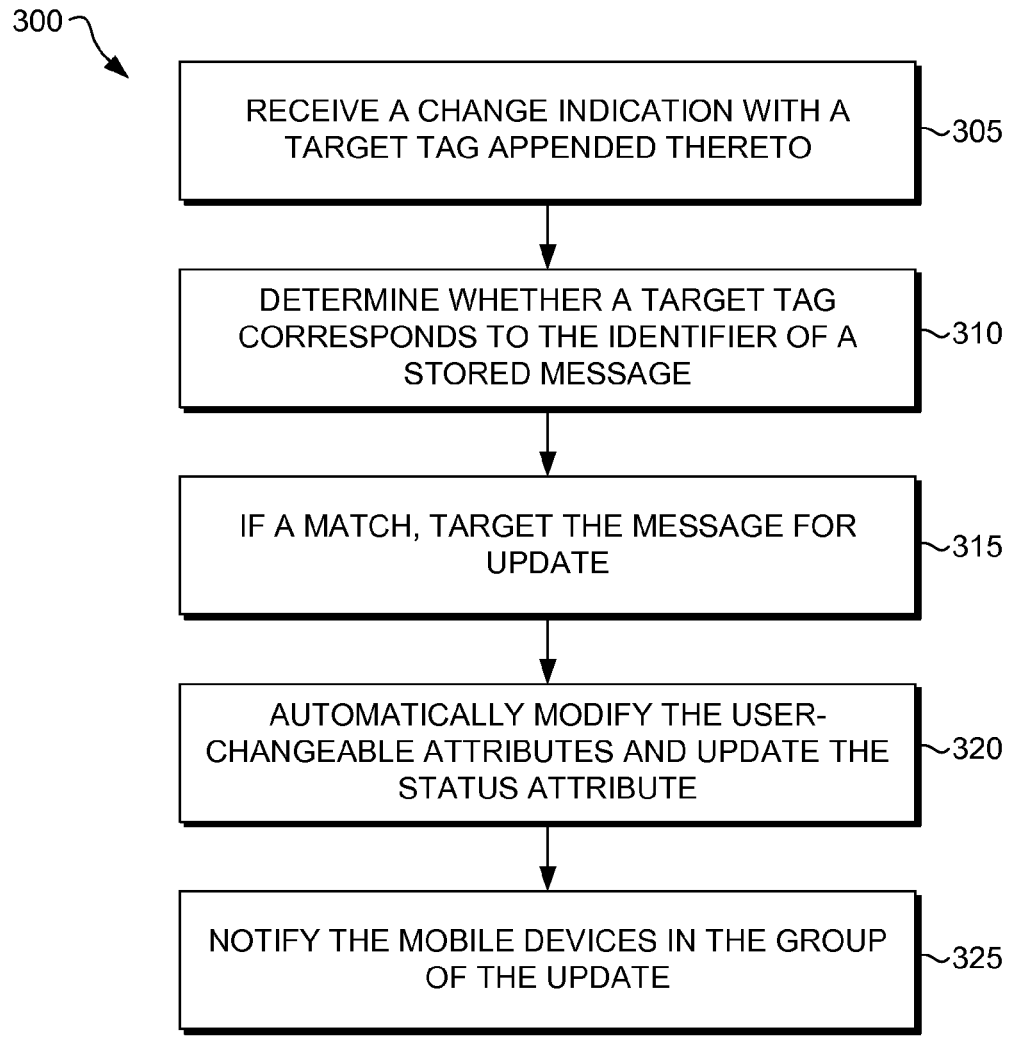
FIG. 3 is a flow diagram showing a method for targeting a message upon receiving a change indication, in accordance with an embodiment of the present invention.

With reference to FIG. 3, a flow diagram is illustrated that shows a method 300 for targeting a message upon receiving a change indication, in accordance with an embodiment of the present invention. As indicated at block 305, one or more change indications with target tags appended thereto are received, typically at server device 110. A determination of whether the target tag corresponds to the identifier of a stored message is indicated at block 310. As indicated at block 315, if a match is determined upon the comparison, the message is targeted for being updated. Next, the contents of the targeted message are automatically updated based on updateable attributes associated with the selectable options, as indicated at block 320. As indicated at block 325, information, such as an updated-message notification, is communicated to notify, or re-alert, one or more members of the group of the update.

Figure 4:
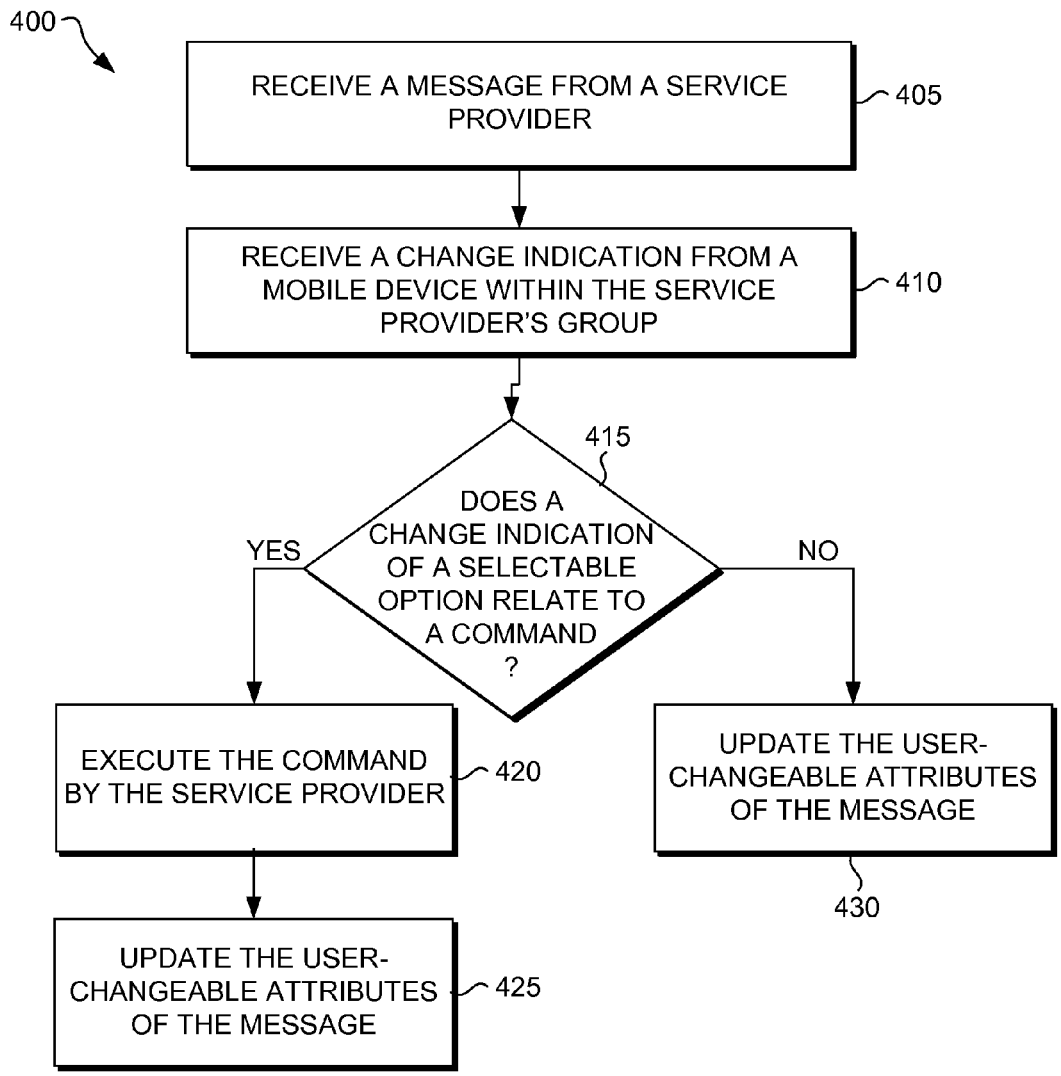
FIG. 4 is a flow diagram showing a method for executing a command in response to an indication, in accordance with an embodiment of the present invention.

A flow diagram is illustrated in FIG. 4 that shows a method 400 for executing a command in response to an indication, in accordance with an embodiment of the present invention. As indicated at block 405, a message is received from a service provider. As indicated at block 410, a change indication is received. Typically, the indication is communicated from a mobile device in within the service provider's group. Next, a determination of whether the change indication of a selectable option relates to a command may be made by the service provider. This is indicated at block 415. If the indication relates to a command, the command is executed, typically at the execution application on the service-provider server. This is indicated at block 420. Concomitantly, the updateable attributes of the message may be automatically updated, as indicated at block 425. If, however, the indication does not relate to a command, or the indication is not detected by the execution application, no command is executed. But, the updateable attributes of the message are still updated, as indicated at block 430.

Figure 5:
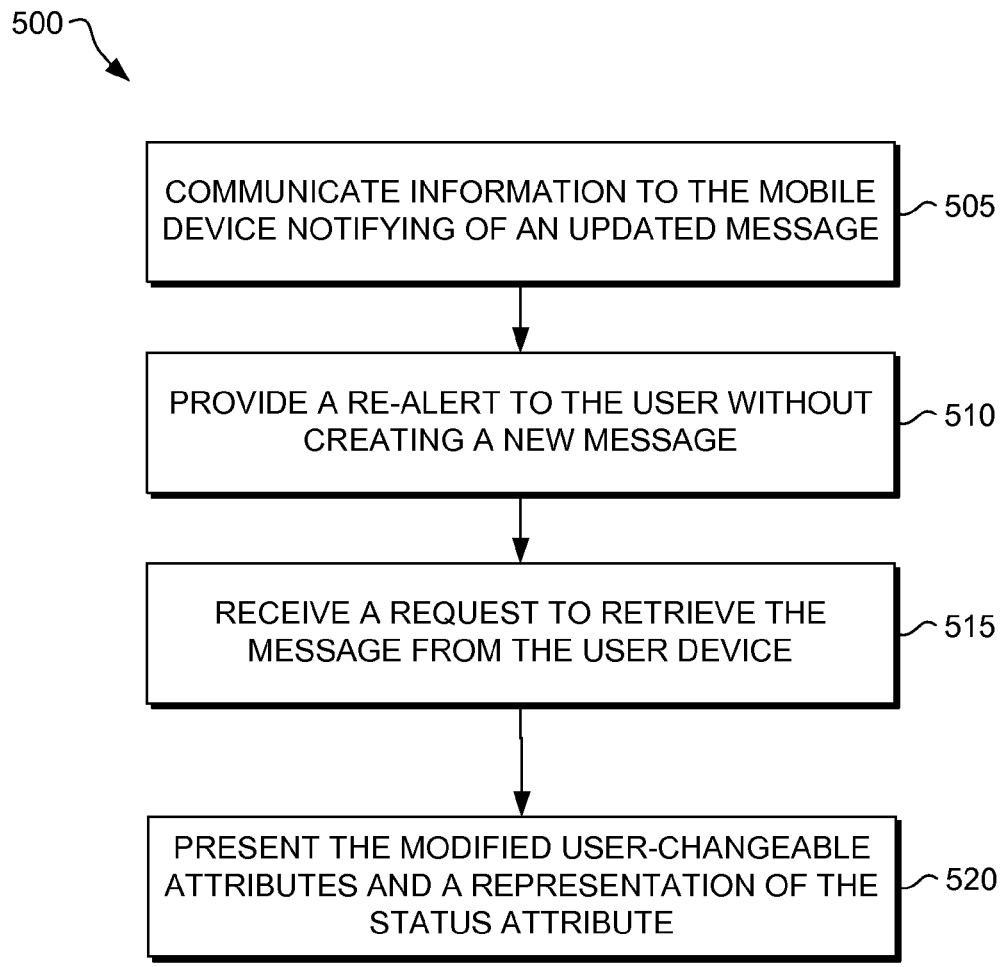
FIG. 5 is a flow diagram showing a method for alerting a user of modified content, in accordance with an embodiment of the present invention.

Turning now to FIG. 5, a flow diagram is illustrated that shows a method 500 for alerting a user of modified content, in accordance with an embodiment of the present invention. Initially, as indicated at block 505, information, such as an updated-message notification, is communicated to the mobile device. A re-alert, as more fully discussed above, may be provided to the user of the mobile device within the group. In addition, the information may be provided without creating a new, or distinct, message, as indicated at block 510. As indicated at block 515, a request to retrieve the message may be sent from the user device. In response, representations of the selectable options and status attribute and content may be presented to the user on a user interface of the mobile device. This is indicated at block 520.

Figure 6:
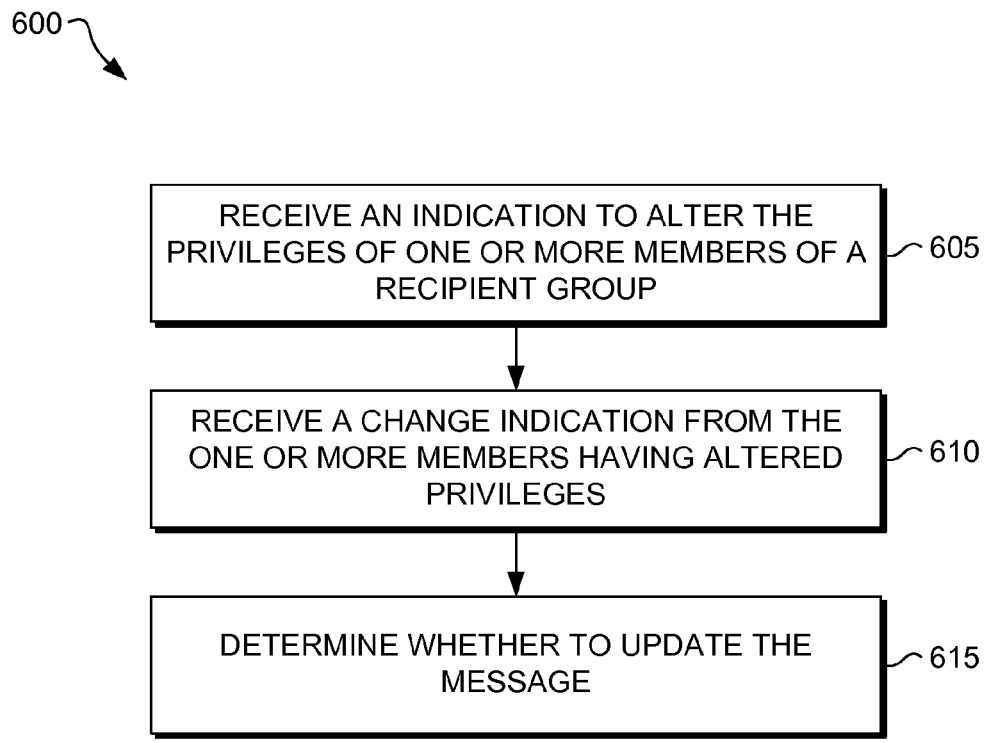
FIG. 6 is a flow diagram showing a method for altering the privileges of one or more members of a group, in accordance with an embodiment of the present invention.

With reference to FIG. 6, a flow diagram is illustrated that shows a method for altering the privileges of one or more members of a group, in accordance with an embodiment of the present invention. Initially, an indication to alter the privileges of one or more members of a group is communicated by a mobile device, as indicated at block 605. Subsequently, as indicated at block 610, an indication of selectable options from the one or more members having altered rights may be received, typically at service-provider server 140. At this point, an internal determination may be made as to whether the content of the message is to be automatically updated. This is indicated at block 615.

Figure 7:
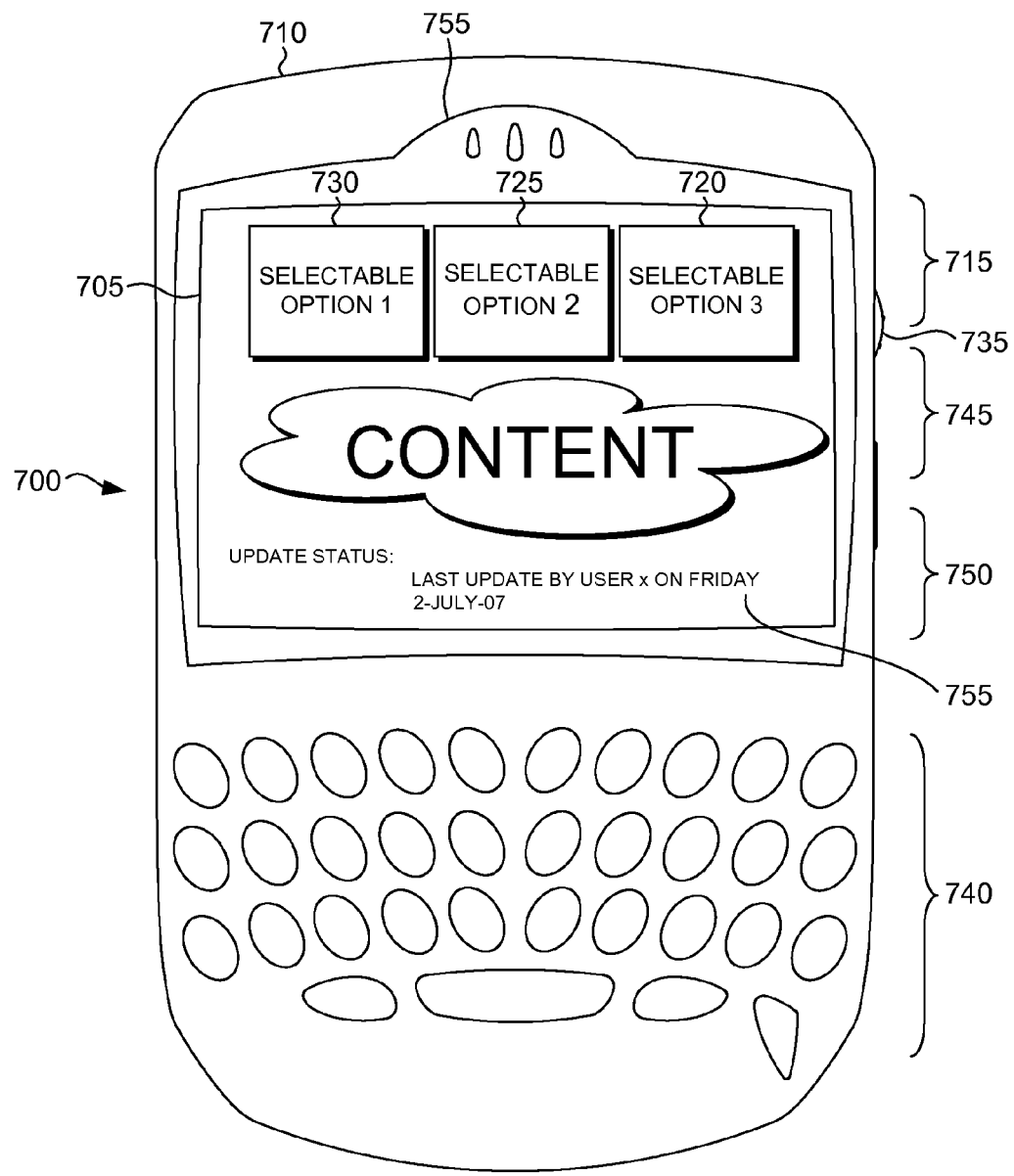
FIG. 7 is an exemplary screen display of an exemplary user interface on a mobile device wherein content and one or more representations of selectable options are presented in accordance with embodiments of the present invention.

With reference to FIG. 7, an exemplary screen display 700 of an exemplary user interface 705 on a mobile device 710 is illustrated in accordance with embodiments of the present invention, wherein content and one or more representations of selectable options and a status attribute are presented. A first display area 715 is depicted as a header of the presented message. Further, first display area 715 includes a representation of selectable options 720, 725, and 730. It should be understood and appreciated that the representation of selectable options 720, 725, and 730, may take any form or configuration that may be presented at a user interface. Further, the number of selectable options being represented may range from zero to a multitude, as this invention considers an updateable message being presented to one or more recipients with no user actions represented on their user interface. As more fully discussed above, selectable options 720, 725, and 730 may be selectable by a user of mobile device 710. In embodiments of the present invention, selection may be by touch-screen indication, a scroll wheel 735, use of keypad controls 740, or any other input mechanism that may be provided on mobile device 710. A second display area 745 includes the presentation of content, or, if a selectable option indication is received, modified content. A third display area 750 includes a representation of a status attribute 755. In this embodiment, status attribute 755 includes the time of the latest message update and an indicia of the member of the group that provided the latest change indication. Accordingly, mobile device 710 provides a rich, cumulative, content display at user interface 705, where content 745, and representations of selectable options 720, 725, and 730 and status attribute 755 are concurrently visible to the user. Those familiar with display devices in the industry will understand and appreciate that the configuration depicted on exemplary user interface 705 may be arranged in any manner available for communicating information to a user.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of updating a dynamically updateable message, the method comprising:

receiving at a receiving mobile device a dynamically updateable message ("message"), wherein the message includes a set of updateable attributes that are alterable upon one or more members of a group selecting one or more user actions respectively mapped to the set of updatable attributes, wherein the one or more user actions represent respective options that are selectable by a user, and wherein the message is distributed to the members of the group, which includes the receiving mobile device and a sending mobile device, wherein the members of the group are equipped with peer-to-peer networking capabilities over a network that allow for updating the message locally at the members without assistance of a server; reading underlying code of the message to determine whether an identifier contained in the message is recognized, wherein, when the identifier is recognized, handling the message as having updatable capabilities, wherein, when the identifier is not recognized, handling the message as having no updatable capabilities, and wherein the identifier is configured for conveying programming logic for installing an update application at one or more of the members of the group;

storing the message on the receiving mobile device, wherein the message is accessible by the update application installed on the receiving mobile device, and wherein the update application is configured to alter the set of updatable attributes within the message while stored on the receiving mobile device;

receiving a change indication from the sending mobile device, wherein receiving the change indication comprises:
- (a) presenting selectable options to a user of the sending mobile device, wherein the selectable options are generated from the message stored at the sending mobile device;
- (b) detecting a selection of an option from the selectable options, wherein the selected option is mapped to a target updatable attribute within the set of updatable attributes included within the message; and
- (c) carrying an indication of the selected option from the sending mobile device to the mobile device within the change indication;

upon receiving the change indication from the sending mobile device, updating the message stored at the receiving mobile device by invoking the update application to alter the target updatable attribute, which is mapped to the selected option; and communicating to a user of the receiving mobile device at least one notification that indicates that the message is updated.

2. The media of claim 1, further comprising storing the message in association with the altered target updateable attribute such that a representation of the altered target updateable attribute is presented upon retrieval of the updated message by the one or more member users.

3. The media of claim 2, wherein the message is communicated by way of one or more of short message service (SMS) or multimedia messaging service (MMS) telecommunications protocol, the message being stored in a short message service center (SMSC) or a multimedia messaging service center (MMSC) server device.

4. The media of claim 1, wherein invoking the update application to alter the target updatable attribute comprises:
receiving the change indication having a target tag appended thereto; and
identifying the message to update based on whether the target tag corresponds thereto.

5. The media of claim 4, the method further comprises:
updating a status attribute of the message residing on the receiving mobile device incident to receiving the change indication; and presenting a representation of the updated status attribute upon retrieval by one or more members of the group.

6. The media of claim 1, the method further comprising, incident to receiving the change indication from one or more members of the group, communicating at least one notification to a service provider, wherein the service provider is configured to detect the indication and execute a command associated with the selected user action communicated by the change indication.

7. The media of claim 1, the method further comprising the sending mobile device automatically communicating the updated-message notification to one or more members of the group, wherein the updated-message notification alerts the one or more members of the group that the updateable attributes of the message stored on their respective devices have been automatically modified.

8. The media of claim 1, wherein updating the message by invoking the update application to alter the target updatable attribute occurs prior to a user of the receiving mobile device consuming the message.

9. The media of claim 1, wherein the selectable options included within the message are configurable by a service provider or one or more members of the group.

10. The media of claim 7, the method further comprising:
incident to communicating from the sending mobile device at least one updated-message notification to one or more members within the group, receiving an indication to alter the privileges of the sending mobile device; and determining whether to update the message on the sending mobile device based on the received indication to alter the privileges.

11. One or more computer-readable media having computer-useable instructions embodied thereon for performing a method of updating a dynamically updateable message, the method comprising:
receiving the dynamically updateable message ("message") at a receiving mobile device in a telecommunications protocol, the message having one or more user-changeable attributes associated therewith, wherein the one or more user-changeable attributes that are alterable upon one or more members of a group selecting one or more selectable actions respectively mapped to the one or more user-changeable attributes, wherein the one or more selectable actions represent respective options that are selectable by a user, wherein the message is distributed to the members of the group, which includes the receiving mobile device and a sending mobile device, wherein the members of the group are equipped with peer-to-peer networking capabilities over a network that allow for updating the message locally at the members without assistance of a centralized server;

storing at the receiving mobile device the message in association with an update application installed on the receiving mobile device the mobile, and wherein the update application is configured to alter the one or more user-changeable attributes within the message while stored on the receiving mobile device;

reading code underlying the message to determine whether an identifier contained in the message is embedded therein, wherein recognizing the identifier within the underlying code indicates that the message has the capability of being updated incident to receiving a change request, and wherein failing to recognize the identifier within the underlying code indicates that the message has no updatable capabilities; and wherein the identifier is configured for conveying programming logic for installing an update application at one or more of the members of the group;

receiving a change request from a sending mobile device, wherein the sending mobile device represents a member of the group that stores the message thereon, and wherein, upon a user of the sending mobile device selecting a selectable option mapped to a target user-changeable attribute of the one or more user-changeable attributes included within the message on the sending mobile device, the sending mobile device sending the change request that carries an indication of the selected selectable option without the transmission of an updated message; and upon determining that the message stored at the receiving mobile device has the capability of being updated, and upon receiving the change request, automatically updating the message stored at the receiving mobile device by invoking the update application to alter the target user-changeable attribute, which is mapped to the selected selectable option, wherein updating the message involves modifying content of the message locally at the receiving mobile device to reflect the selection of the user of the sending mobile device without redistributing the message to the receiving mobile device from a server or the sending mobile device; and communicating to a user of the receiving mobile device at least one notification that indicates that the message is updated.

12. The media of claim 11, the method further comprising communicating information associated with the user-changeable attributes in an updated-message notification to the or more members of the group.

13. The media of claim 11, the method further comprising communicating the altered target user-changeable attribute incident to retrieval by a user of the receiving mobile device.

14. The media of claim 13, the method further comprising presenting content of the message and a representation of the one or more selectable options to a user of the receiving mobile device upon retrieval of the message.

15. The media of claim 13, the method further comprising, incident to a server device receiving the change indication selected by one or more members of the group, reading the change indication and executing a command related to the selected selectable option communicated by the change indication.

16. One or more computer-readable media having computer-useable instructions embodied thereon for presenting on a mobile device a user interface configured to presentation aspects of a dynamically modifiable message, the user interface comprising:

a first display area that presents a representation of one or more selectable options to a user of a receiving mobile device, wherein the one or more selectable options are mapped to updateable attributes within code of the dynamically modifiable message ("message") residing on the mobile device, wherein the updateable attributes are altered upon a member of a group selecting the one or more selectable options included within the message, wherein the message is distributed to the members of the group, which includes the receiving mobile device and a sending mobile device, wherein the members of the group are equipped with peer-to-peer networking capabilities over a network that allow for updating the message locally at the members without assistance of a server, and before sending an identifier contained in the message, wherein the sending mobile device is equipped for reading the message to determine whether the identifier is embedded therein, wherein recognizing the identifier indicates that the message has the capability of being updated incident to receiving a change request, and wherein failing to recognize the identifier indicates that the message has no updatable capabilities; and wherein the identifier is configured for conveying programming logic for installing an update application at one or more of the members of the group;

a second display area that presents content of the message, wherein the content is automatically modified to correspond to the updateable attributes that are modified via the process comprising:

(a) receiving the change request indicating a selection of a selectable option of the one or more selectable options rendered by the message residing at the sending mobile device, wherein the selected selectable option is mapped to a target updatable attribute of the updatable attributes included within the message; and (b) automatically updating the message stored at the receiving mobile device by invoking the update application to alter the target updatable attribute, which is mapped to the selected selectable option, wherein updating the message involves modifying content of the message locally at the receiving mobile device to reflect the selected selectable option at the sending mobile device; and a third display area that presents a representation of a status attribute, the status attribute indicating the selected selectable option; and communicating to a user of the receiving mobile device at least one notification that indicates that the message is updated.

17. The user interface of claim 16, wherein the message is provided in SMS or MMS telecommunications protocol.

18. The user interface of claim 16, wherein the content is automatically modified to correspond to the target updateable attributes prior to the second display area presenting the content of the message in the second display area to the user.

* * * * *